United States Patent [19]

Arakawa et al.

[11] Patent Number: 4,488,404
[45] Date of Patent: Dec. 18, 1984

[54] HYDRAULIC FLUID RESERVOIR FOR AUTOMOBILE

[75] Inventors: Susumu Arakawa, Chiryu; Tooru Tsukigahora, Toyota; Akira Shirai, Toyoake, all of Japan

[73] Assignees: Aisin Seiki Kabushiki Kaisha, Kariya; Toyota Jidoshakogyo Kabushikikaisha, Toyota, both of Japan

[21] Appl. No.: 391,836

[22] Filed: Jun. 24, 1982

[30] Foreign Application Priority Data

Jun. 26, 1981 [JP] Japan ............................ 56-93881[U]

[51] Int. Cl.³ .................... B60T 17/22; F15B 7/00
[52] U.S. Cl. ...................... 60/535; 60/584; 60/585; 60/592; 220/20.5; 220/22
[58] Field of Search ............ 60/584, 585, 591, 592, 60/534, 535; 340/52 C; 116/227; 367/908; 200/84 R, 84 B, 84 C; 220/20, 20.5, 21, 22

[56] References Cited

U.S. PATENT DOCUMENTS

| | | | |
|---|---|---|---|
| 3,208,281 | 9/1965 | Kalmus et al. | 367/908 |
| 3,542,055 | 11/1970 | Belart | 60/534 |
| 3,678,232 | 7/1972 | Hodges | 200/84 C |
| 3,680,044 | 7/1972 | Tsubouchi | 200/84 |
| 4,046,977 | 9/1977 | Cadeddu | 200/84 C |
| 4,057,700 | 11/1977 | Nakashima | 200/84 C |
| 4,094,437 | 6/1978 | Hayashida | 220/374 |
| 4,136,712 | 1/1979 | Nogami et al. | 60/535 |
| 4,217,922 | 8/1980 | Come | 60/592 |
| 4,356,729 | 11/1982 | Kubota et al. | 200/84 C |
| 4,414,810 | 11/1983 | Reinartz et al. | 60/592 |

FOREIGN PATENT DOCUMENTS

| | | | |
|---|---|---|---|
| 1555822 | 8/1970 | Fed. Rep. of Germany | 60/585 |
| 55-156975 | 11/1979 | Japan | 60/592 |
| 55-112401 | 8/1980 | Japan | 60/585 |
| 1164070 | 9/1969 | United Kingdom | 60/585 |

*Primary Examiner*—Robert E. Garrett
*Assistant Examiner*—Scott L. Moritz
*Attorney, Agent, or Firm*—Burns, Doane, Swecker and Mathis

[57] ABSTRACT

A hydraulic fluid reservoir for automobile including a plurality of fluid chambers separated by a partition, the fluid chambers being communicated with hydraulic systems in the automobile respectively, and a baffle plate between the upper end of the partition and an inlet at the upper portion of a reservoir body to define openings of the respective fluid chambers at predetermined ratios which define the flow rates of fluid into respective fluid chambers.

7 Claims, 3 Drawing Figures

HYDRAULIC FLUID RESERVOIR FOR AUTOMOBILE

BACKGROUND OF THE INVENTION

The present invention relates to a hydraulic fluid reservoir for automobiles, in particular, to a reservoir which allows air extraction operation on assembly of hydraulic systems in the automobile in a short period of time.

In a reservoir of the type in which hydraulic fluid is supplied to a plurality of hydraulic systems such as brake and clutch systems, air extraction of the brake and clutch systems has been effected by introducing hydraulic fluid into an inlet to distribute the fluid to respective chambers separated by a partition wall. However the chambers are successively filled with the fluid according to priority from the chamber located closest to the inlet. Accordingly, air extraction operation of one hydraulic system is not started until the air extraction of another hydraulic system has been completed. Thus it requires a long period of time to complete the air extraction procedure of all the hydraulic systems.

SUMMARY OF THE INVENTION

It is an object of the present invention to provide a hydraulic fluid reservoir in which air extraction from hydraulic systems may be effected in a short period of time.

In accordance with the present invention there is provided a hydraulic fluid reservoir for automobiles including a plurality of fluid chambers separated by a partition, the fluid chambers being communicated with hydraulic systems in the automobile respectively, wherein a baffle plate is provided between the upper end of the partition and an inlet at the upper portion of a reservoir body to define openings of the respective fluid chambers at predetermined ratios which define the flow rates of fluid into respective fluid chambers.

Fluid which has been introduced to the reservoir via the inlet is distributed to respective chambers by the baffle plate. The flow rates of fluid into the respective fluid chambers are generally depending upon the openings of the fluid chambers and/or the locations of the openings. Thus all of the hydraulic systems which are communicated with respective fluid chambers may be concurrently filled up with fluid, i.e. substantially simultaneously, so that air extraction procedure from respective hydraulic systems may be simultaneously completed within a short period of time. This may contribute to reduction of time requisite for assembling automobiles.

In the following, the present invention will be elucidated by accompanying drawings which serve to better illustrate and not to limitation of the invention.

DETAILED DESCRIPTION OF THE PREFERRED EMBODIMENTS

Figure 1:
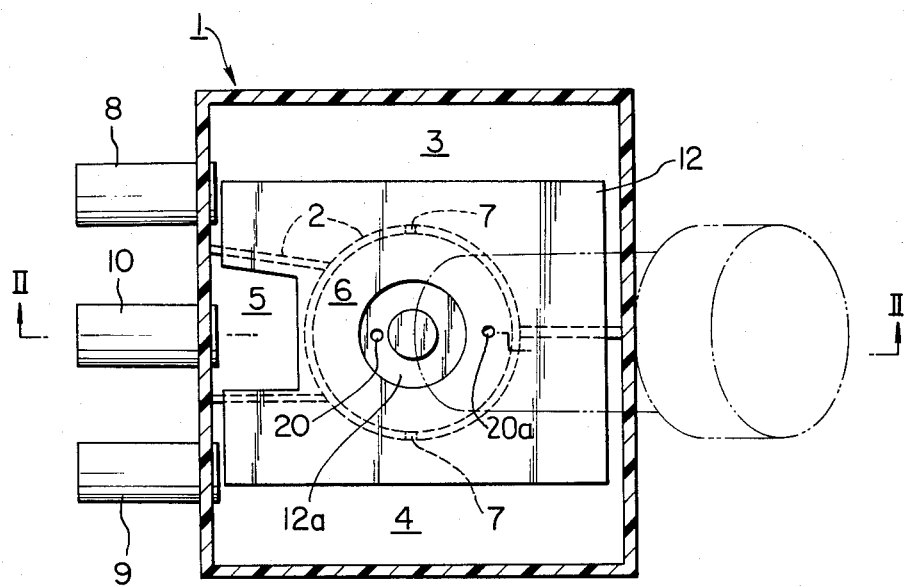
FIG. 1 is a plan sectional view showing a hydraulic fluid reservoir of the present invention along the line I—I of FIG. 2.

An embodiment of the present invention will be described with reference to the drawings. A body 1 of a reservoir is of a hollow structure as shown in FIG. 1. The inner space of the reservoir is divided by a partition 2 into a first brake fluid chamber 3, a second brake fluid chamber 4, a clutch fluid chamber 5, and a float chamber 6. The clutch fluid chamber 5 is independent of the first and second brake fluid chambers 3 and 4. The first brake fluid chamber 3 is communicated with the second brake fluid chamber 4 through slits 7 provided in the partition 2 which defines the float chamber 6.

Outlets 8, 9 and 10 are provided in a side wall of the reservoir body 1 in the vicinity of the bottom thereof. The outlet 8 is communicated with a master cylinder (not shown) of a first brake through a suitable conduit. The outlet 9 is communicated with a master cylinder (not shown) of a second brake. The outlet 10 is communicated with a clutch master cylinder (not shown).

At the upper portion of the reservoir body 1 is provided a filler neck or inlet 11 through which hydraulic fluid is introduced.

Figure 2:
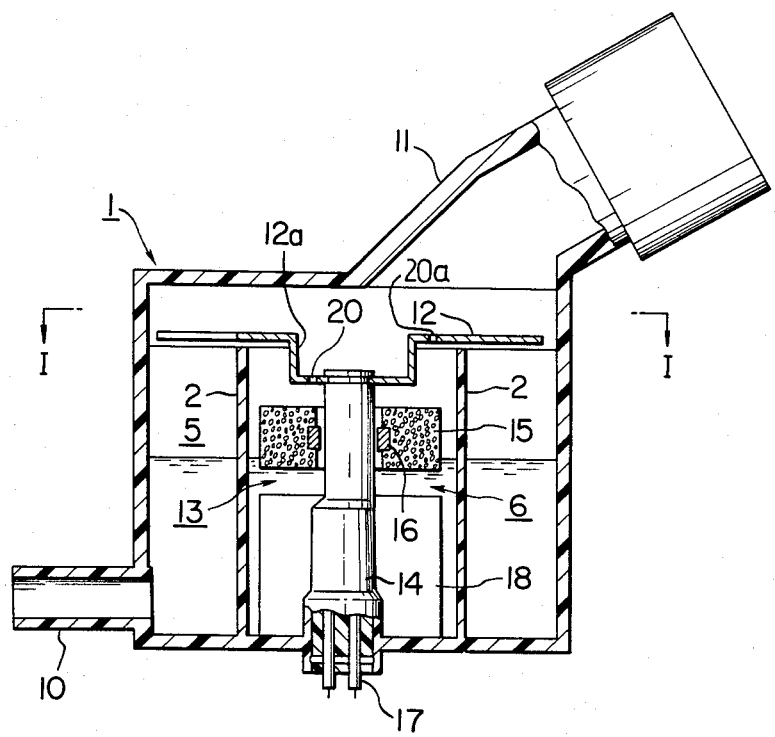
FIG. 2 is an elevational, sectional view showing the reservoir along the line II—II of FIG. 1.

Respective fluid chambers 3, 4 and 5 open at the upper end thereof and is partially covered with a baffle plate as shown in FIGS. 1 and 2.

A fluid level detector 13 is disposed in the center of the float chamber 6. The fluid level detector 13 includes a rod-like switch casing 14, extending from the bottom of the reservoir body 1, provided with a reed switch (not shown) and a float 15 movable along the casing 14. A magnet 16 is retained at the inner periphery of the float 15. When the level of the fluid within the first and second brake fluid chambers 3 and 4 is lowered to cause the float 15 to reach a predetermined level, the reed switch is actuated to energize an alarm device (not shown) through conductors 17. Upward and downward movement of the float 15 is restricted by a baffle plate 12 and a lower stopper 18 respectively. The baffle plate 12 acts as an upper stopper.

The baffle plate 12 is centrally fitted into a groove of the upper end of the casing 14. In this embodiment, the baffle plate 12 is substantially rectangular in plan, notched at an area above the clutch fluid chamber 5 and provided with a hole 20 above the float chamber 6. The purpose of the baffle plate 12 is to distribute the fluid and to preset the flow rates of fluid to be poured into the respective fluid chambers when fluid is charged via the inlet 11. The presetting of the flow rates makes it possible to shorten the period of time required to extract residual air from the respective hydraulic systems since air extraction of respective systems may be simultaneously completed. The form of the baffle plate 12 is not limited to only such a form as shown in FIG. 1 and may assume other forms suitable to preset desired flow rates into the respective liquid chambers. The flow rate of the fluid into a chamber is generally proportional to the opening and depending upon the location thereof about the inlet 11. The opening is defined usually by the upper portion of the chamber, e.g., reservoir body, wall and the baffle plate.

Preferably, the baffle plate 12 is so arranged as to allow a clearance from the top end of a partition 2. The float chamber 6 is preferably covered by the baffle plate 12 which arrangement enables more rapid air extraction since fluid does not flow into the float chamber 6 at the initial moment of fluid introduction into the reservoir.

Centrally above the float chamber 13, a recess 12a is provided in the baffle plate 12, and a hole 20 is provided in the recess 12a. The bottom of the recess 12a is designed to act as a stopper for the float. Residual fluid in the recess 12a upon introducing fluid will gradually flow down through the hole 20 provided in the recess bottom into the float chamber 6 after the air extraction has been completed. Another hole 20a is also provided in the baffle plate for air extraction.

Figure 3:
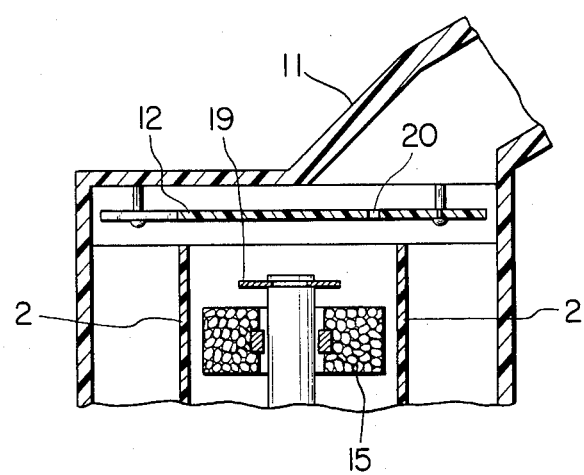
FIG. 3 is a partial sectional view showing an alternative embodiment of the present invention.

An alternative embodiment of the present invention in which mounting of the baffle plate 12 is changed is shown in FIG. 3. In this case the baffle plate 12 is not a combined upper stopper 19 for the float 15. The baffle plate 12 is mounted on a top wall of the reservoir body 1.

The principles, preferred embodiments and modes of operation of the present invention have been described in the foregoing specification. However, the invention which is intended to be protected is not to be construed as limited to the particular embodiments disclosed. The embodiments are to be regarded as illustrative rather than restrictive. Variations and changes may be made by others without departing from the spirit of the present invention. Accordingly, it is expressly intended that all such variations and changes which fall within the spirit and scope of the present invention as defined in the claims be embraced thereby.

What is claimed is:

1. A hydraulic fluid reservoir for an automobile including:
   (a) a reservoir case including a wall portion and a top portion with an inlet defined in the top portion,
   (b) a plurality of fluid chambers defined by a partition positioned within the reservoir case, each of said fluid chambers being in communication with separate hydraulic systems in the automobile,
   (c) a float chamber being defined by the partition and extending from the bottom of the reservoir case so as to define an opening therein, the float chamber in communication with at least one of the fluid chambers wherein the partition for said fluid chambers and the float chamber defines a horizontal plane parallel to and vertically spaced from the top portion of the reservoir casing,
   (d) a float guide extending from a bottom section of the reservoir case into said float chamber so as to receive a float thereon, and
   (e) a substantially flat baffle plate positioned between an upper end of the partition and the inlet and defining a clearance from the upper end of the partition to substantially cover the opening of the fluid chamber and to define openings of predetermined ratio to the fluid chambers, said openings determining the flow rates of the fluid into the fluid chambers in cooperation with upper sections of the wall portion of the reservoir case.

2. The reservoir as defined in claim 1, wherein the float chamber includes a stopper plate which extends from the bottom of the reservoir case toward the top portion of the reservoir case and defines a lower limit position of the float.

3. The reservoir as defined in claim 1, wherein the baffle plate is mounted to the upper end of a float guide which extends upward from the bottom of the reservoir case.

4. The reservoir as defined in claim 3, wherein the baffle plate acts as an upper stopper for a float which moves along the float guide.

5. The reservoir as defined in claim 1, wherein the baffle plate is mounted on a top wall of the reservoir case.

6. The reservoir as defined in claim 1, wherein the baffle plate has a recess provided with a hole therein.

7. The reservoir as defined in claim 1, wherein the baffle plate is so arranged as to allow air communication between a float chamber and the outside thereof.

* * * * *